United States Patent
Macfadyen

(10) Patent No.: US 7,118,321 B2
(45) Date of Patent: Oct. 10, 2006

(54) AIR COOLED BEARING

(75) Inventor: Timothy E. Macfadyen, Stroud (GB)

(73) Assignee: Rolls-Royce PLC, London (GB)

( * ) Notice: Subject to any disclaimer, the term of this patent is extended or adjusted under 35 U.S.C. 154(b) by 57 days.

(21) Appl. No.: 10/802,945

(22) Filed: Mar. 18, 2004

(65) Prior Publication Data
US 2004/0202536 A1 Oct. 14, 2004

(30) Foreign Application Priority Data
Apr. 12, 2003 (GB) ................. 0308488.6

(51) Int. Cl.
F01D 25/08 (2006.01)

(52) U.S. Cl. .................. 415/11; 415/175; 415/180; 416/174

(58) Field of Classification Search ........ 415/111–112, 415/180, 175–176, 229; 416/174; 384/317–321, 384/476, 900
See application file for complete search history.

(56) References Cited

U.S. PATENT DOCUMENTS

| 2,709,567 A | * | 5/1955 | Wood | 415/115 |
|---|---|---|---|---|
| 2,950,943 A | * | 8/1960 | Forrest | 384/465 |
| 3,767,949 A | * | 10/1973 | Newill | 310/90 |
| 4,006,944 A | * | 2/1977 | Ando et al. | 384/466 |
| 5,435,414 A | * | 7/1995 | Barrett | 184/6.4 |
| 6,223,740 B1 | * | 5/2001 | Kim et al. | 126/110 R |
| 6,551,055 B1 | * | 4/2003 | Rockwood | 415/111 |
| 6,860,639 B1 | * | 3/2005 | Tabuchi et al. | 384/513 |
| 6,886,985 B1 | * | 5/2005 | Kostrzewsky et al. | 384/317 |

FOREIGN PATENT DOCUMENTS

| GB | 2 024 894 A | 1/1980 |
|---|---|---|
| JP | 5003643 A | 1/1993 |
| JP | 9046960 A | 2/1997 |
| JP | 2003023753 A | 1/2003 |

* cited by examiner

Primary Examiner—Edward K. Look
Assistant Examiner—Devin Hanan
(74) Attorney, Agent, or Firm—Oliff & Berridge, PLC

(57) ABSTRACT

An air cooled bearing comprising means for imparting a swirl component to the cooling air flowing toward the bearing. By imparting a swirl component to the cooling air the amount of work imparted on the cooling air by the rotating cage and rolling elements of the bearing can be reduced and in some cases substantially eliminated.

11 Claims, 2 Drawing Sheets

AIR COOLED BEARING

This invention relates to an air cooled bearing, and in particular an air cooled bearing in a gas turbine engine where the bearing is cooled by a continuous stream of cooling air.

The main engine bearings in a gas turbine engine are usually fed with a continuous flow of oil which not only lubricates the but also cools the bearings in use. Total. loss oil systems are used in engines such as the Rolls Royce Viper turbojet engine where the bearings are fed approximately 250 mls of oil per hour. The relatively low oil flow rate lubricates but does not cool the bearings. Total loss lubrication systems are particularly suitable for engines which run for short periods of time, such as vertical lift engines or expendable engines that have a relatively short design life. Total loss oil systems are much simpler than recirculatory type oil systems since it is possible to dispense with oil coolers, scavenge pumps and/or filters. In this type of lubrication system once the oil has lubricated the bearing the oil is either injected into the main gas stream of the engine or retained within an oil reservoir which drains overboard when the engine is shut down.

Bearings in engines having a total loss oil system generally run hotter than those in engines where the bearings are cooled by a continuous flow of oil, used for lubrication. The bearings are usually cooled using relatively large amounts of cooling air bled from the engine compressor in use.

In one arrangement cooling air enters the bearing flowing in the axial direction of the bearing such that the cooling air passes through the gap between the cage and the rolling elements of the bearing. This has the effect that the cage and rolling elements impart work on the cooling air as it passes through the gap which results in the cooling air and the bearing being heated, thereby increasing the probability of bearing failure, and also results in a torque being applied to the bearing by the resistance of the cooling air on the bearing cage. The latter increases the probability of skidding of the rolling elements with respect to the inner and outer races of the bearing.

There is a requirement therefore for an air cooled bearing suitable for use in a gas turbine engine having a total loss oil system where the cooling effectiveness of the cooling air is improved in comparison with known arrangements.

According to an aspect of the invention there is provided an air cooled bearing comprising means for imparting a swirl component to the cooling air flowing toward the bearing. By imparting a swirl component to the cooling air the amount of work imparted on the cooling air by the rotating cage and rolling elements of the bearing can be reduced and in some cases substantially eliminated.

In preferred embodiments, the means for imparting a swirl component comprises a vane or a plurality of vanes. The vane or vanes maybe fixed in relation to a bearing support or the vanes may be rotatable with respect to the bearing support. Alternatively one or more vanes may be fixed in relation to the bearing support and at least one further vane may be rotatable with respect to the bearing support.

In preferred embodiments the vane or vanes may be connected to the rotatable shaft supported by the bearing, for example an assembly comprising either a "blisk", that is to say an integral bladed disc, or a series of relatively small blades may be attached to the rotatable shaft in the region of the bearing cage.

Preferably, the bearing comprises a cage for retaining rolling elements of the bearing, and whereby the means for imparting a swirl component to the cooling air is configured so that the swirl direction of the cooling air is substantially the same as the direction of rotation of the bearing cage. In this way the vanes pre-swirl (rotate) the cooling air so that when it enters the gap between the cage and the rollers it has a circumferential component in the same direction as the direction of rotation of the cage. Preferably, the cooling air enters the gap between the cage and the rolling elements with a circumferential velocity component substantially the same as the rotational velocity of the bearing cage. In embodiments where the cooling air is pre-swirled in the same direction and at the same speed as the bearing cage the heating effect is minimised, and the torque acting on the cage due to the work done on the air by the cage is also minimised. In this way the operational temperature of the bearing is reduced and the probability of the bearing rolling elements skidding is also reduced.

In preferred embodiments a plurality of pre-swirl vanes impart a circumferential velocity component on the cooling air that is approximately half the shaft rotation speed, that is to say half the engine speed in a gas turbine application.

The present invention also contemplates a gas turbine engine or lift fan engine or the like comprising at least one air cooled bearing having means for imparting a swirl component to cooling air flowing towards the said bearing.

Preferred embodiments of the invention will now be more particularly described, by way of example only, with reference to the accompanying drawings, in which.

Figure 1:
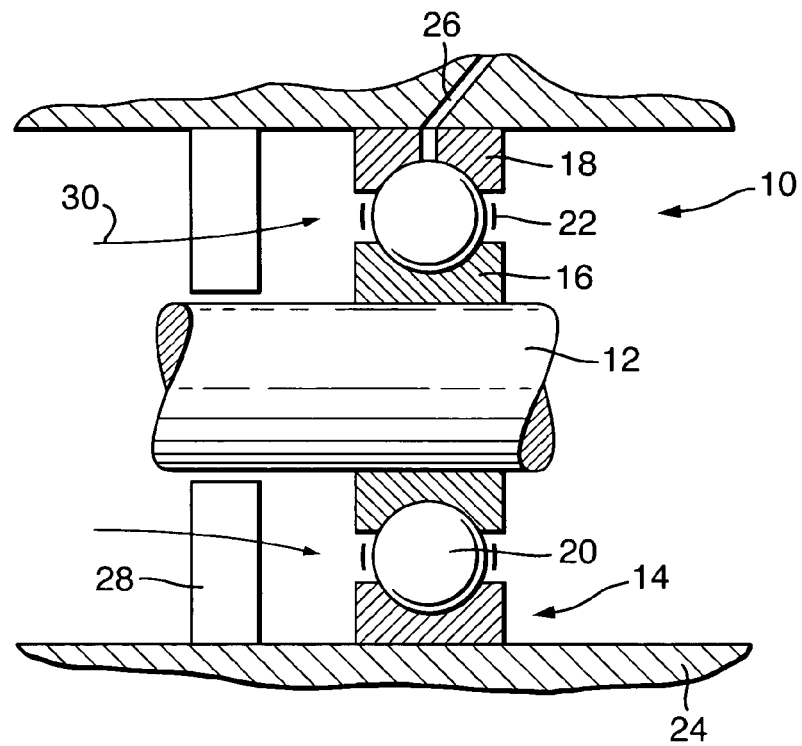
FIG. 1 is an axi-symmetric view of an air cooled bearing according to one embodiment and invention.

Referring to FIG. 1, an air cooled bearing assembly 10 for rotatably supporting a gas turbine engine shaft 12 comprises a rolling element type bearing 14 having an inner race 16, an outer race 18 and a plurality of spherical balls 20 positioned radially between the inner and outer races 16 and 18. The balls 20 are retained within a bearing cage structure 22 as is well known in the art. The bearing 14 rotatably mounts the engine shaft 12 with respect to a bearing support structure 24 which is fixed with respect to the engine casing (not shown). The bearing assembly 10 is lubricated by lubricating oil which is fed through one or more oil feed galleries 26 in the bearing support 24 and the outer race 18. The galleries 26 constitute part of a total loss oil lubrication system.

The bearing assembly 10 is further provided with an annular array of circumferentially spaced vanes 28 which are fixed in relation to the bearing support 24 and extend radially between the bearing support 24 and the engine shaft 12. The vanes 28 constitute pre-swirl vanes for imparting a swirl component in the circumferential direction of the bearing on cooling air flowing towards the bearing, as indicated by cooling flow arrows 30, for the purpose of cooling the bearing assembly 14. The cooling air 30 is preferably bled from the engine compressor and flows from left to right in the drawing of FIG. 1 in an axial direction towards the bearing assembly 14. Prior to entering the bearing assembly, in the region between the inner and outer races, the cooling air passes through the array of vanes 28 which act to pre-swirl the air so as to provide the air with a circumferential component about the engine axis.

The amount of swirl, or angle of swirl, imparted on the cooling air by the vanes 28 is determined so that the swirl velocity and direction is substantially the same as the rotational velocity and direction of the bearing cage 22 at engine design speed, that is to say the normal rotational speed of the engine in use. As is well known in the art, the rotational speed of the bearing cage 22 is approximately half that of the rotational speed of the engine shaft 12 supported by the bearing assembly.

Figure 2:
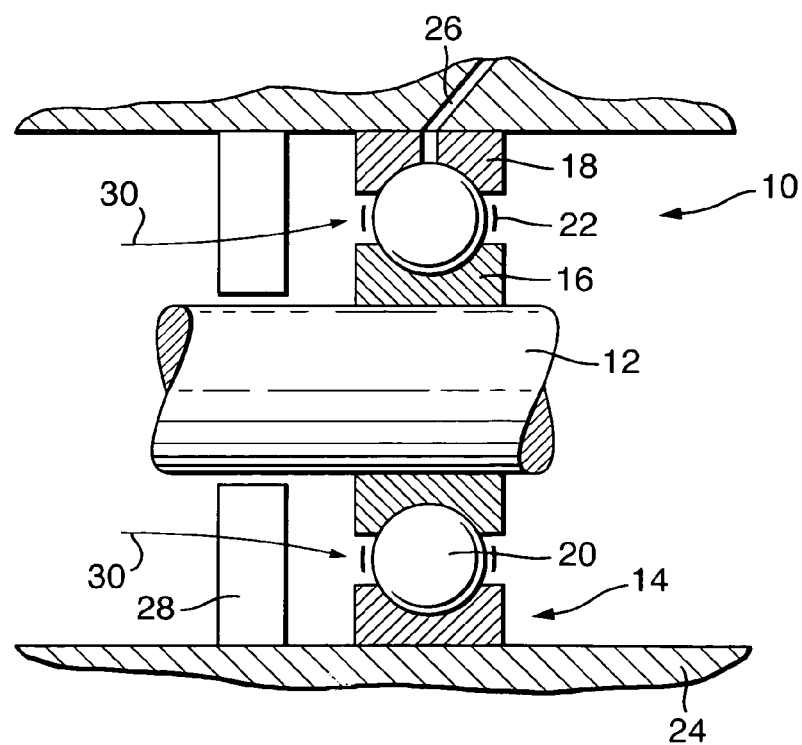
FIG. 2 is a view similar to that of FIG. 1 showing a different embodiment of the invention.

In the embodiment of FIG. 1 the vanes 28 are fixed relative to the bearing support 24 such that the vanes 28 define an array of stator vanes. In the embodiment of FIG. 2 the bearing assembly 10 is identical to that of FIG. 1 except that the vanes 28 are fixed in relation to and circumferentially spaced about the engine shaft 12. In this embodiment the vanes 28 comprise an annular array of rotor vanes which rotate about the engine axis with the engine shaft 12. The vanes 28 in the embodiment of FIG. 2 function in the same way as the vanes in the embodiment of FIG. 1 in the sense that they act as pre-swirl vanes for imparting a swirl component to the cooling air 30 flowing towards the bearing 14. In the embodiment of FIG. 2 the vanes 28 extend from the surface of the shaft 12 radially towards the bearing support structure 24 with the tips of the vanes defining a relatively small clearance gap between the vanes the bearing support 24. In a slightly modified embodiment to that of FIG. 2 (not shown) the rotor vanes 28 may be part of an integral bladed disk (blisc or blisk) which is fixed to the engine shaft 12 for rotation therewith.

Figure 3:
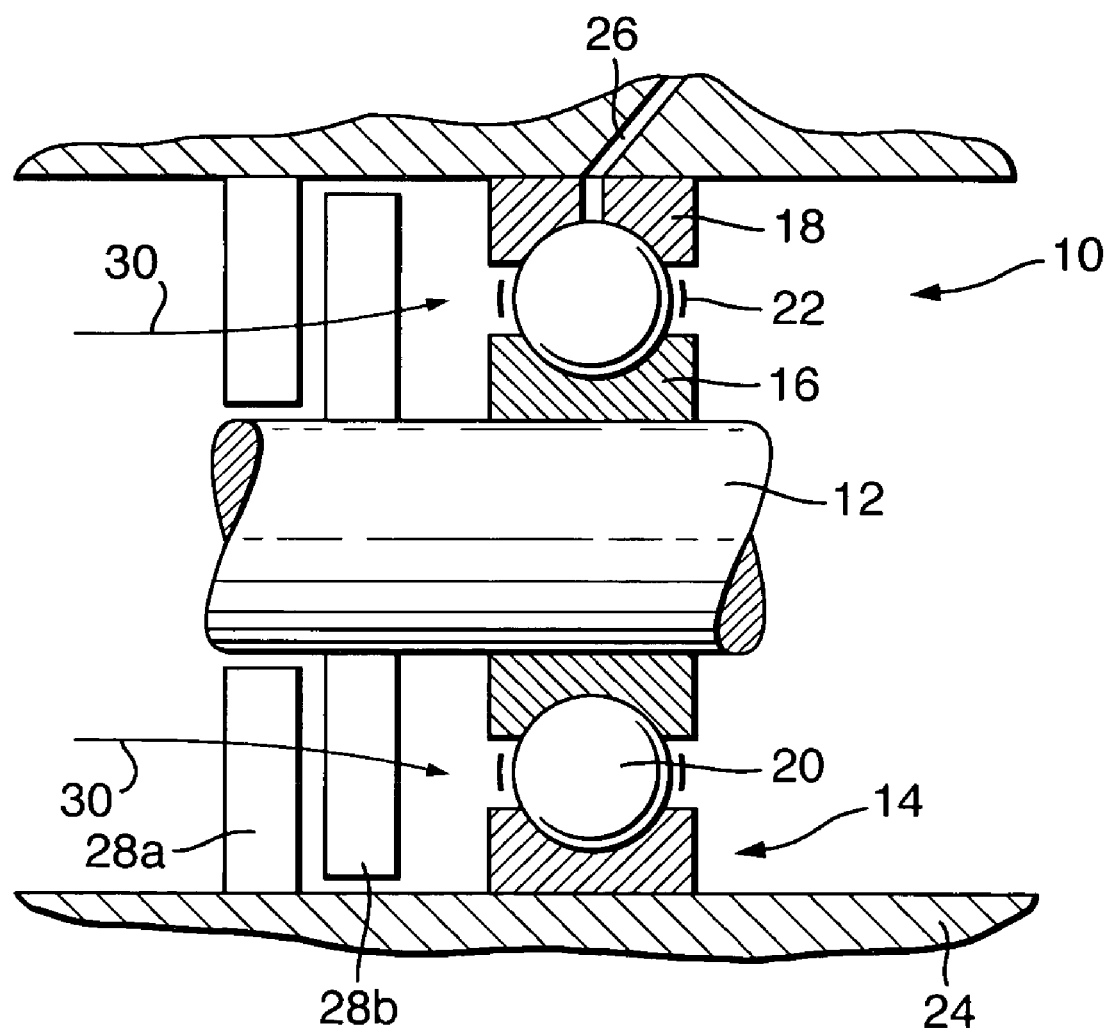
FIG. 3 is a view similar to that of FIGS. 1 and 2 showing a further embodiment of the invention.

In the embodiment of FIG. 3 the bearing assembly 10 comprises an upstream array of circumferentially spaced stator vanes 28a, as in the embodiment of FIG. 1, and an array of circumferentially spaced rotor vanes 28b downstream of the stator vanes 28a similar to the arrangement of the stator vanes 28 in the embodiment of FIG. 2. The combined effect of the stator and rotor vanes 28a, 28b in the embodiment of FIG. 3 is the same as the vanes in the embodiment of either FIG. 1 or 2, that is to say to impart a swirl component to the cooling air 30 flowing towards the bearing assembly 14.

Although aspects of the invention have been described with reference to the embodiments shown in the accompanying drawings, it is to be understood that the invention is not limited to those precise embodiments and that various changes and modifications may be effected without further inventive skill and effort. For example, the invention envisages embodiments of an air cooled bearing in applications other than a gas turbine engine, and/or embodiments where the bearing is fed with a limited flow of lubricating oil in a total loss lubrication system. The present invention is applicable to any bearing application where cooling or additional cooling of the bearing is required.

The invention claimed is:

1. An air cooled bearing, comprising means for imparting a swirl component to cooling air flowing towards the bearing, the means for imparting a swirl component comprising at least one vane, wherein the at least one vane is fixed in relation to a bearing support means of the bearing.

2. An air cooled bearing, comprising means for imparting a swirl component to cooling air flowing towards the bearing, the means for imparting a swirl component comprising at least one vane, wherein the at least one vane comprises at least one first vane and a second vane, and the at least one first vane is fixed with respect to a bearing support means of the bearing and the second vane is rotatable with respect to the bearing support means.

3. An air cooled bearing, comprising means for imparting a swirl component to cooling air flowing towards the bearing, the means for imparting a swirl component comprising at least one vane, wherein the bearing comprises a total loss oil lubrication means.

4. A being as claimed in claim 3, wherein the at least one vane is fixed in relation to a bearing support means of the bearing.

5. A bearing as claimed in claim 3, wherein the at least one vane is rotatable in relation to a bearing support of the bearing.

6. An air cooled bearing, comprising:
rolling elements;
a bearing cage for retaining the rolling elements of the bearing, the bearing cage rotating in a first direction in use; and
means for imparting a swirl component to an axially flowing continuous stream of cooling air and directing the cooling air toward and through the bearing cage with the swirl component of the cooling air being directed in substantially the same direction as the first direction, the means for imparting a swirl component including at least one vane.

7. A bearing as claimed in claim 6, wherein the at least one vane is rotatable with respect to a bearing support means of the bearing.

8. A bearing as claimed in claim 7, wherein the at least one vane is connected to a rotatable shaft supported by the bearing.

9. A bearing as claimed in claim 6, wherein the means for imparting a swirl component to the cooling air is configured such that the circumferential swirl velocity of the cooling air is substantially equal to the rotational velocity of the bearing cage in use.

10. A gas turbine engine comprising at least one bearing as claimed in claim 6.

11. A bearing as claimed in claim 6, wherein the at least one vane is fixed in relation to a bearing support means of the bearing.

* * * * *